United States Patent
Murray

(10) Patent No.: US 8,587,841 B2
(45) Date of Patent: Nov. 19, 2013

(54) COMPACT CONFIGURATION FOR A SCAN BAR ASSEMBLY

(75) Inventor: Richard A. Murray, San Diego, CA (US)

(73) Assignee: Eastman Kodak Company, Rochester, NY (US)

( * ) Notice: Subject to any disclaimer, the term of this patent is extended or adjusted under 35 U.S.C. 154(b) by 132 days.

(21) Appl. No.: 13/297,640

(22) Filed: Nov. 16, 2011

(65) Prior Publication Data

US 2013/0120804 A1 May 16, 2013

(51) Int. Cl.
*H04N 1/04* (2006.01)
(52) U.S. Cl.
USPC .......................... 358/474; 358/475; 358/482
(58) Field of Classification Search
USPC ........ 358/474, 475, 497, 496, 486, 1.13, 509, 358/482, 483
See application file for complete search history.

(56) References Cited

U.S. PATENT DOCUMENTS

| | | | |
|---|---|---|---|
| 5,614,985 A * | 3/1997 | Odaka .............................. | 396/51 |
| 6,075,236 A * | 6/2000 | Lamproye et al. .......... | 250/208.1 |
| 6,246,492 B1 * | 6/2001 | Chang et al. ................... | 358/497 |
| 6,473,206 B1 * | 10/2002 | Fujimoto et al. .............. | 358/497 |
| 6,681,994 B1 * | 1/2004 | Koenck ...................... | 235/472.01 |
| 7,130,089 B2 | 10/2006 | Yoshida | |
| 7,898,702 B2 * | 3/2011 | Hill et al. ....................... | 358/474 |
| 8,456,655 B2 * | 6/2013 | Tan ................................ | 358/1.13 |
| 8,493,588 B2 * | 7/2013 | Tan et al. ....................... | 358/1.14 |

* cited by examiner

Primary Examiner — Negussie Worku
(74) Attorney, Agent, or Firm — Peyton C. Watkins

(57) ABSTRACT

A scan bar assembly includes an illuminating unit including a first length; a photosensor array including a second length; and a first spacer member and a second spacer member, each of the first and second spacer members including: an inner side that is proximate the photosensor array; and an outer side that is distal to the photosensor array, wherein a distance between the inner side of the first spacer member and the inner side of the second spacer member is greater than the second length and less than the first length.

17 Claims, 5 Drawing Sheets

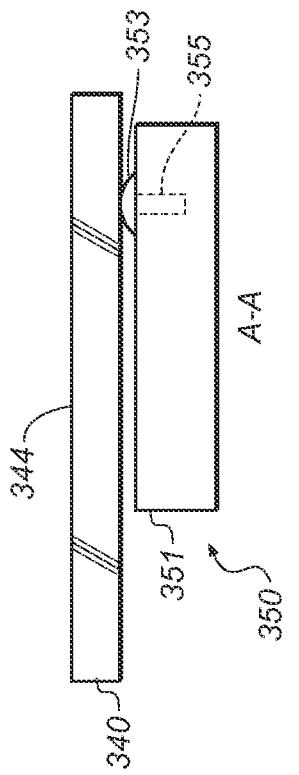
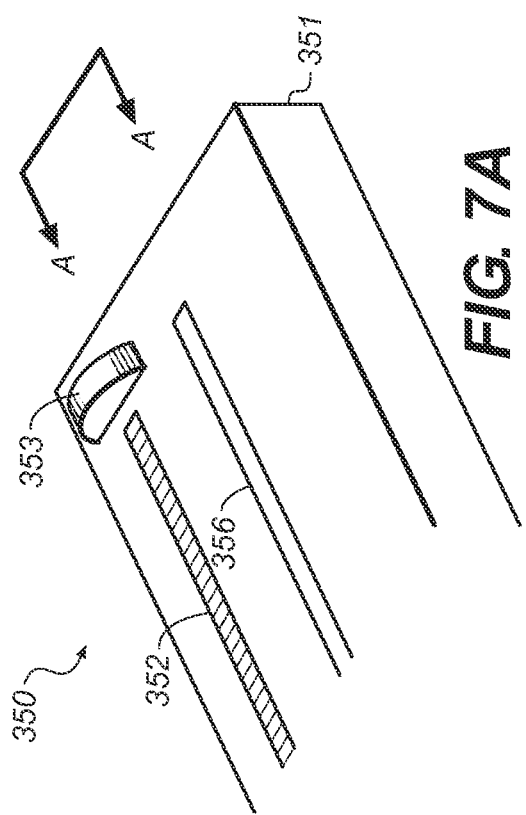

COMPACT CONFIGURATION FOR A SCAN BAR ASSEMBLY

CROSS REFERENCE TO RELATED APPLICATION

Reference is made to commonly assigned, co-pending U.S. patent application Ser. No. 12/842,074, filed Jul. 23, 2010 entitled "Compact Housing for a Scan Bar Assembly" by R. Murray, the disclosure of which is herein incorporated by reference.

FIELD OF THE INVENTION

The present invention relates to a scan bar assembly for an optical scanner, and more particularly to a compact configuration for a photosensor array, illuminating unit and spacer members of the scan bar assembly.

BACKGROUND OF THE INVENTION

Optical scanners operate by imaging an object (e.g. a document) with a light source, and sensing a resultant light signal with an optical sensor array. Each optical sensor or photoreceptor in the array (typically a linear array) generates a data signal representative of the intensity of light impinged thereon for a corresponding portion of the imaged object. The data signals from the array of sensors are then processed (typically digitized) and stored in a temporary memory such as a semiconductor memory or on a hard disk of a computer, for example, for subsequent manipulation and printing or display, such as on a computer monitor. The image of the scanned object is projected onto the optical photo sensor array incrementally by use of a moving scan line. The moving scan line is produced either by moving the document with respect to scan bar assembly that includes the array of optical sensors, or by moving the scan bar assembly relative to the document. Either or both of these methods can be embodied in a flat bed scanner, multi-function printer, or any scanner having manual and automatic feed capabilities.

A common type of scanner uses a contact image sensor (CIS) scan bar. A CIS scan bar includes a contact image sensor scan element having a length that is substantially equal to the width of the scanning region. The photoreceptors in a CIS are substantially the same size as the pixel resolution of the scanner. The CIS has a short depth of field and is typically mounted beneath the transparent platen (scanner glass) upon which the document is placed. A scan bar assembly includes the CIS scan element, as well as gears for power transmission to move the scan bar assembly. One or more spacers in the CIS scan bar assembly are biased against the bottom of the scanner glass so that the CIS scan element is always at substantially the same distance from the top of the scanner glass.

U.S. Pat. No. 6,246,492 discloses a movable module, which includes a contact image sensor and a driving motor and which can slide back and forth along a track to scan an image. The driving motor exerts a force by means of a pinion on a fixed rack attached to the frame of the scanner.

U.S. Pat. No. 7,898,702 describes a scanner module including the optical components, where the scanner module is carried by a carriage that includes a motor and associated gears. FIG. 1 (prior art) corresponds to FIG. 2 of U.S. Pat. No. 7,898,702 and FIG. 2 (prior art) corresponds to FIG. 4 of U.S. Pat. No. 7,898,702. A scanner 120 includes a platen 122, a carriage 124, wheels 126, a bias 128, a drive 130, a light source 132, a reflected light capture unit 134, and a sensor array (not shown). Light source 132, reflected light capture unit 134 and the sensor array are joined to one another to form a scanner module 135 which includes a body 204 and wheels 126. Module 135 is carried by carriage 124. Platen 122 includes a plate, at least a portion of which is transparent, configured to support on its top surface 144 a document or other article to be scanned. A central portion 200 includes that portion of platen 122 through which light is transmitted and through which reflected light passes. Side portions 202 can be transparent or can be opaque. Side portions 202 provide surfaces against which wheels 126 rotate. Carriage 124 carries reflected light capture unit 134, light source 132 and the sensor array as they are moved across and along platen 122. Scan module 135 includes body 204 and two opposing wheel wells 206 that are sized to receive wheels 126, which are retained by caps 210. Bias 128 includes one or more members, such as wheels 214, configured to resiliently urge carriage 124, wheels 126 and reflected light capture unit 134 towards platen 122. As a result, wheels 126 are maintained in constant contact with a surface 152 as carriage 124 is moved across platen 122. Wheels 214 are urged against a stationary surface 216 (schematically shown) associated with the housing of scanner system 120. Drive 130 is configured to move carriage 124 in either direction as indicated by arrows 158 (called the scan direction herein). Drive 130 moves carriage 124 and reflected light capture unit 134 across platen 122 such that a document can be scanned. In the example shown in FIGS. 1 and 2, drive 130 includes a motor 220, a worm gear 224, a drive gear 225, pinion gears 226, 228 and a rack 230 (schematically shown in FIG. 1). Motor 220 is carried by carriage 124 and is connected to an encoder (not shown). Worm gear 224 is in engagement with drive gear 225 which is part of a compound gear also including pinion gear 226. Pinion gears 226 and 228 are in engagement with rack 230. The rotation of pinion gears 226, 228 results in carriage 124 being driven along rack 230 relative to platen 122.

The prior art scan bar assembly shown in FIGS. 1 and 2 is satisfactory in many applications. However, for small footprint scanners or multi-function printers, a limitation to the reduction in overall size can be the size of the scan bar assembly. In particular, a length of a scan bar assembly along a direction perpendicular to scan direction 158 is determined by the distance between outer edges of wheels 126 in FIG. 2, corresponding to the distance between side portions 202 of platen 122 in FIG. 1. A smaller footprint multi-function printer can result in improved convenience to the user, as well as cost savings.

SUMMARY OF THE INVENTION

The present invention is directed to overcoming one or more of the problems set forth above. Briefly summarized, according to one aspect of the invention, the invention resides in a scan bar assembly comprising an illuminating unit including a first length; a photosensor array including a second length; and a first spacer member and a second spacer member, each of the first and second spacer members including: an inner side that is proximate the photosensor array; and an outer side that is distal to the photosensor array, wherein a distance between the inner side of the first spacer member and the inner side of the second spacer member is greater than the second length and less than the first length.

BRIEF DESCRIPTION OF THE DRAWINGS

FIGS. 7A and 7B are a perspective and an end view of an embodiment of the scan bar assembly.

DETAILED DESCRIPTION OF THE INVENTION

Figure 3:
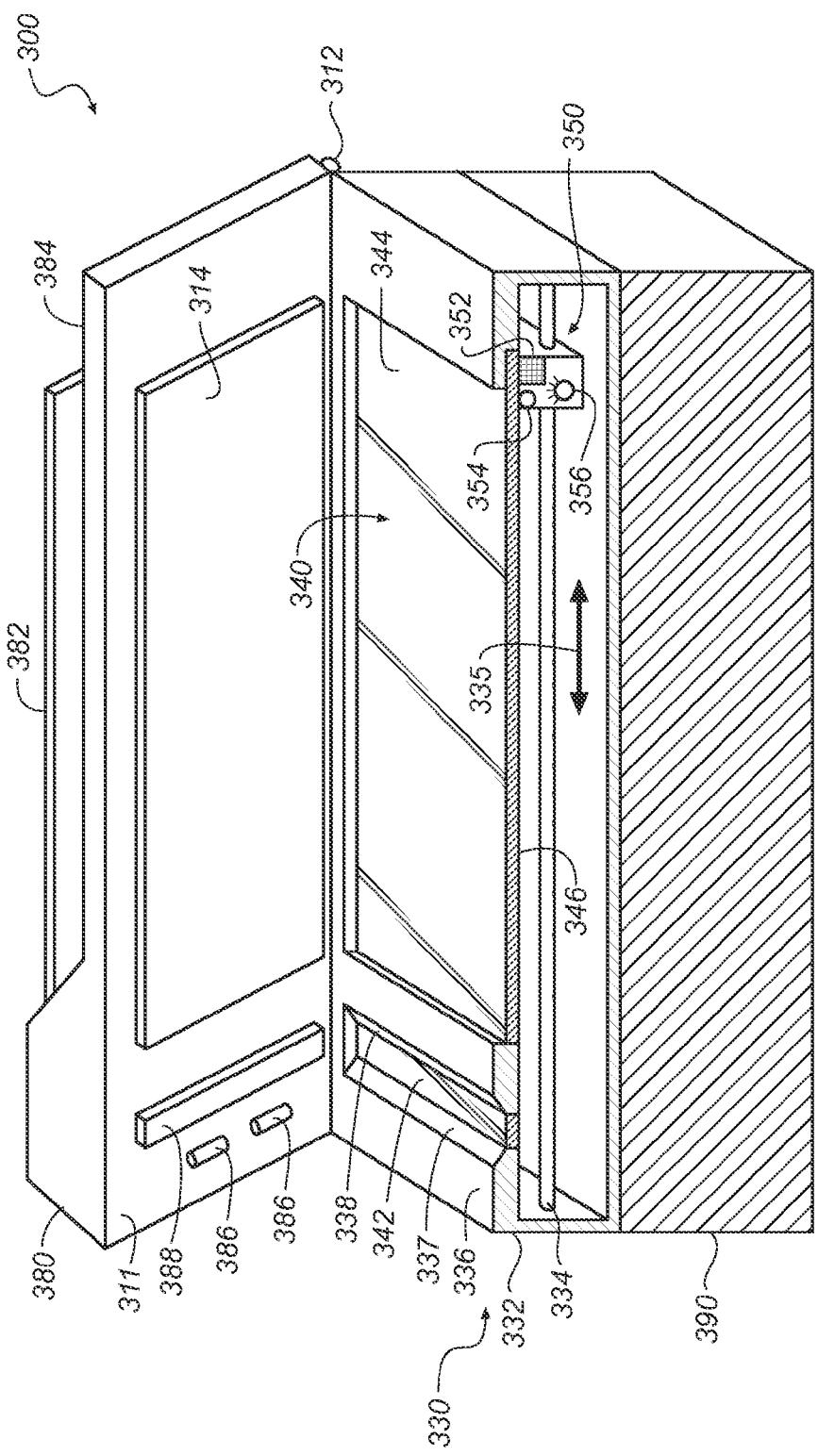
FIG. 3 is a perspective of a multifunction printer including a scanning apparatus and a printing apparatus.

FIG. 3 shows a perspective cut-away view of a multifunction printer 300 including a scanning apparatus 330, an optional automatic document feeder (ADF) 380, and a printing apparatus 390, such as an inkjet printer. Multifunction printer 300 can do printing, scanning of documents, or copying of documents (i.e. printing plus scanning). ADF 380 includes an input tray 382 where documents for scanning or copying are stacked, an output tray 384 for receiving scanned documents. As shown in FIG. 3, ADF 380 can be attached to a scanning apparatus body 332 of scanning apparatus 330 by a hinge 312, so that an under side 311 of ADF 380 can function as a lid for scanning apparatus 330. The surface of scanning apparatus body 332 that is covered by under side 311 of ADF 380 when ADF 380 is closed includes a frame 336. A transparent platen 340 (typically a flat piece of glass) is inset within the frame 336. The front of scanning apparatus 330 is cut away in FIG. 3 in order to show a movable scan bar assembly 350 below transparent platen 340.

Scan bar assembly 350 includes a photosensor array 352 (such as a contact image sensor) extending across most of the width of the transparent platen 340, and an illuminating unit 356 that illuminates a scan line of a document or other item (not shown) that is placed on a support surface 344 of transparent platen 340. Scan bar assembly 350 is moved back and forth along a scanning guide 334 in scanning direction 335 across the length of transparent platen 340 with a spacer member 354 (e.g. a wheel or a slider pad, for example) in contact with a second surface 346 (opposite support surface 344) of transparent platen 340 in order to scan the document or other item. Typically there are two spacer members 354 disposed near opposite ends of photosensor array 352. Spacer members 354 are biased to contact second surface 346 of transparent platen 340. Photosensor array 352 receives reflected light from the item through the transparent platen 340 scan line by scan line and converts the reflected light into electrical signals. A controller (not shown) converts the electrical signals into digitized data to form a digitized image of the item. Scanning guide 334 can be a round rail, a rack and pinion or other guiding member that can use the power of a motor (not shown) to provide a linear motion along the scanning direction 335.

In the manual scanning region, a pressing plate 314 is affixed to under side 311. Pressing plate 314 can be compressible and/or it can be resiliently mounted on under side 311 so that when ADF 380 is lowered over an item to be manually scanned, the item is pressed against support surface 344 of transparent platen 340. Pressing plate 314 typically has a white surface to serve as an optical background and reference for scanning as scan assembly 350 is moved to scan the item. A separate ADF transparent platen 342 is provided for scanning documents being fed by ADF 380. The document to be scanned is moved by a transporter such as rollers 386 down a down ramp 337, across the ADF transparent platen 342, up an up ramp 338 and toward the under side 311 through which it passes on its way to output tray 384. A pressing member 388 forces the document into contact with ADF transparent platen 342 for scanning by scan bar assembly 350, which is parked below ADF transparent platen 342 during ADF scanning. By pressing the document or other item against the support surface of the transparent platen 340 or 342, and by biasing the spacer member(s) 354 to remain in contact with the second surface 346 of transparent platen 340 as the scan bar assembly 350 is moved below transparent platen 340, or as it is parked below ADF transparent platen 342, the document or other item to be scanned remains in good focus, even with the short depth of field of a photosensor array 352 in a contact image sensor.

Figure 4:
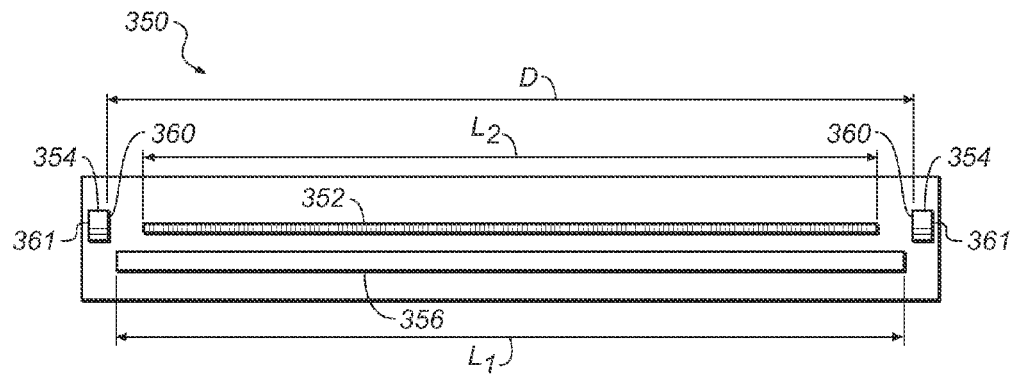
FIG. 4 is a top view of a prior art configuration of a scan bar assembly.

In some configurations of the scan bar assembly 350, illuminating unit 356 is longer than photosensor array 352 in order to provide sufficient illumination all the way to the ends of the photosensor array 352. FIG. 4 shows a schematic top view of a prior art scan bar assembly (i.e. as viewed through the transparent platen 340 (FIG. 3), where the illuminating unit 356 is longer than photosensor array 352 (i.e. the length $L_1$ of illuminating unit 356 is greater than the length $L_2$ of photosensor array 352). The two spacer members 354 each include an inner side 360 that is nearer to photosensor array 352 and an outer side 361 that is farther from photosensor array 352. In this prior art example, spacer members 354 are positioned such that a distance D between the inner side 360 of the first spacer member 354 and the inner side 360 of the second spacer member 354 is greater than length $L_1$ of illuminating unit 356.

Figure 5:
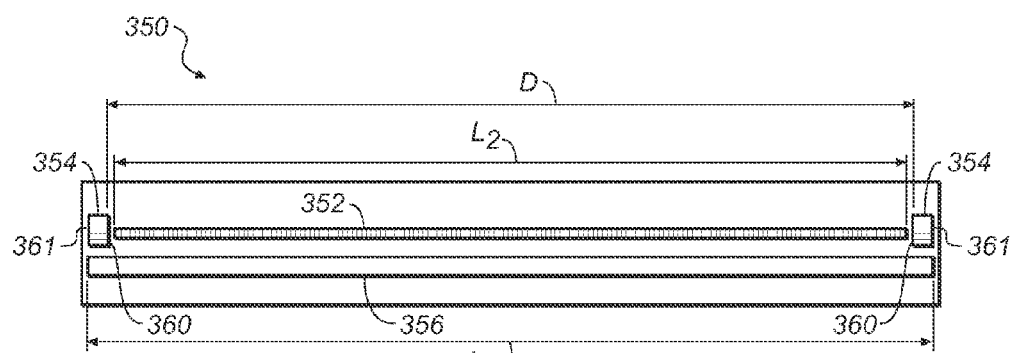
FIG. 5 is a top view of a first embodiment of a scan bar assembly.

FIG. 5 shows a schematic top view of an embodiment of the present invention. As in the prior art example of FIG. 4, the illuminating unit 356 is longer than photosensor array 352 (i.e. the length $L_1$ of illuminating unit 356 is greater than the length $L_2$ of photosensor array 352). However, in the embodiment shown in FIG. 5, spacer members 354 are nested in the space between the ends of the photosensor array 352 and the longer illuminating unit 356. In other words, spacer members 354 are positioned such that a distance D between the inner side 360 of the first spacer member 354 and the inner side 360 of the second spacer member 354 is greater than length $L_2$ of photosensor array 352, but less than length $L_1$ of illuminating unit 356. In fact, in the embodiment shown in FIG. 5, spacer members 354 are positioned such that a distance between the outer side 361 of the first spacer member 354 and the outer side 361 of the second spacer member 354 is less than length $L_1$ of illuminating unit 356. Photosensor array 352 is disposed between the first spacer member 354 and the second spacer member 354. Illuminating unit 356 is substantially parallel to photosensor array 352.

Figure 6:
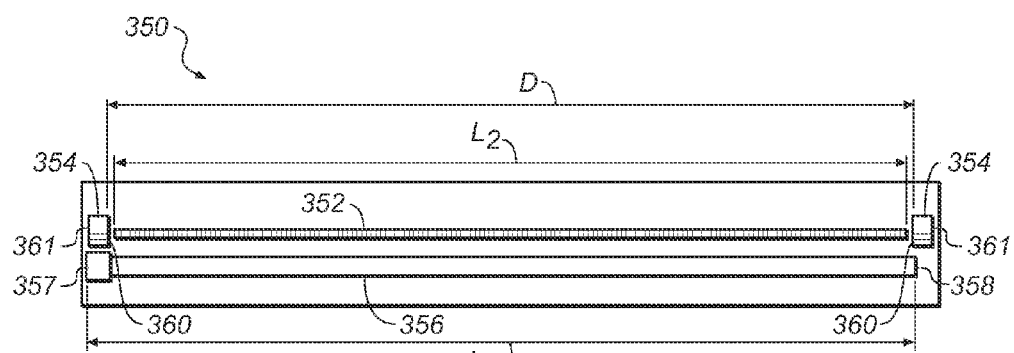
FIG. 6 is a top view of a second embodiment of a scan bar assembly.

Illuminating unit 356 can include a light source that extends the entire length $L_1$ of illuminating unit 356. Alternatively, as shown in the schematic top view of FIG. 6, illuminating unit 356 can include a smaller light source 357 (such as one or more LED's) and a light pipe 358 to distribute the light from light source 357 along the length of photosensor array 352. Also, as indicated in the embodiment shown in FIG. 6, it is not necessary that a distance between outer sides 361 of both spacer members 354 be less than the length $L_1$ of illuminating unit 356 (although such as configuration provides even more space savings as in FIG. 5). Even if the spacer members 354 are partially nested as in FIG. 6, such that a distance D between the inner side 360 of the first spacer member 354 and the inner side 360 of the second spacer member 354 is less than length $L_1$ of illuminating unit 356, it is possible to save a few millimeters in the length of scan bar assembly 350, and as a result, a similar savings in the footprint of scanning apparatus 330 and multifunction printer 300.

Figure 1:
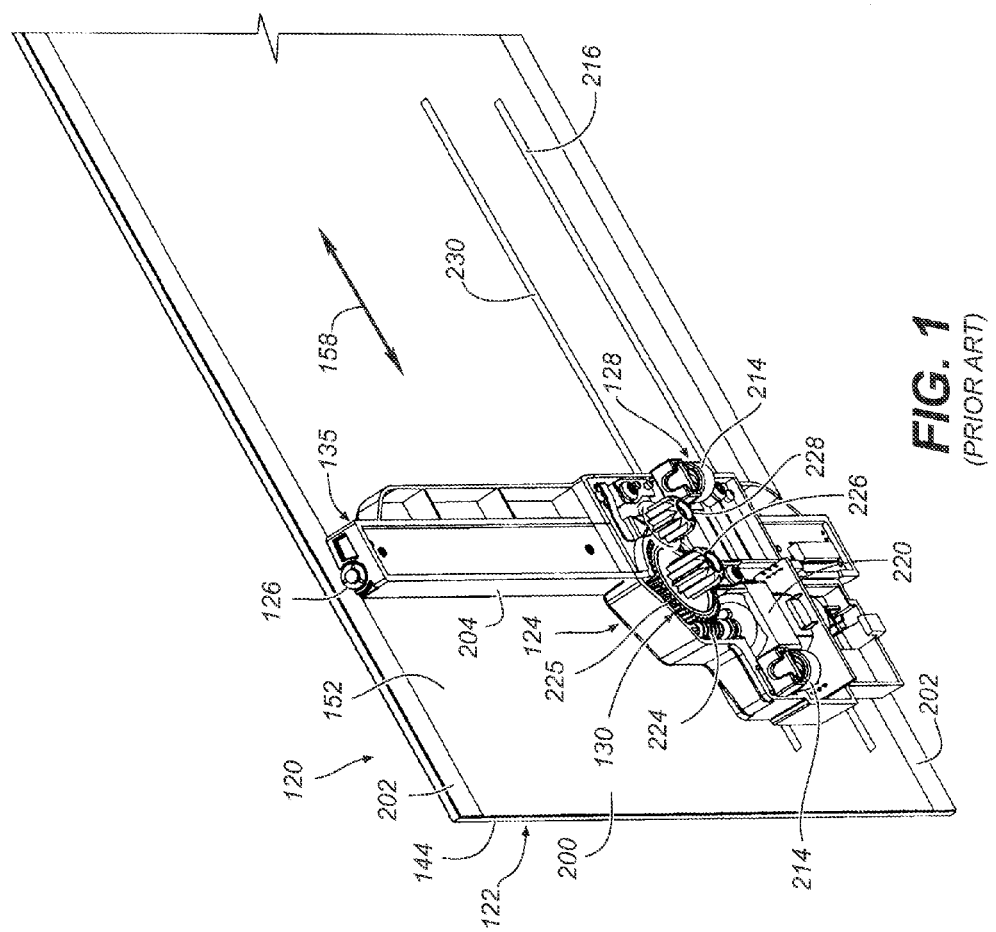
FIG. 1 shows a scanner according to prior art.
Figure 2:
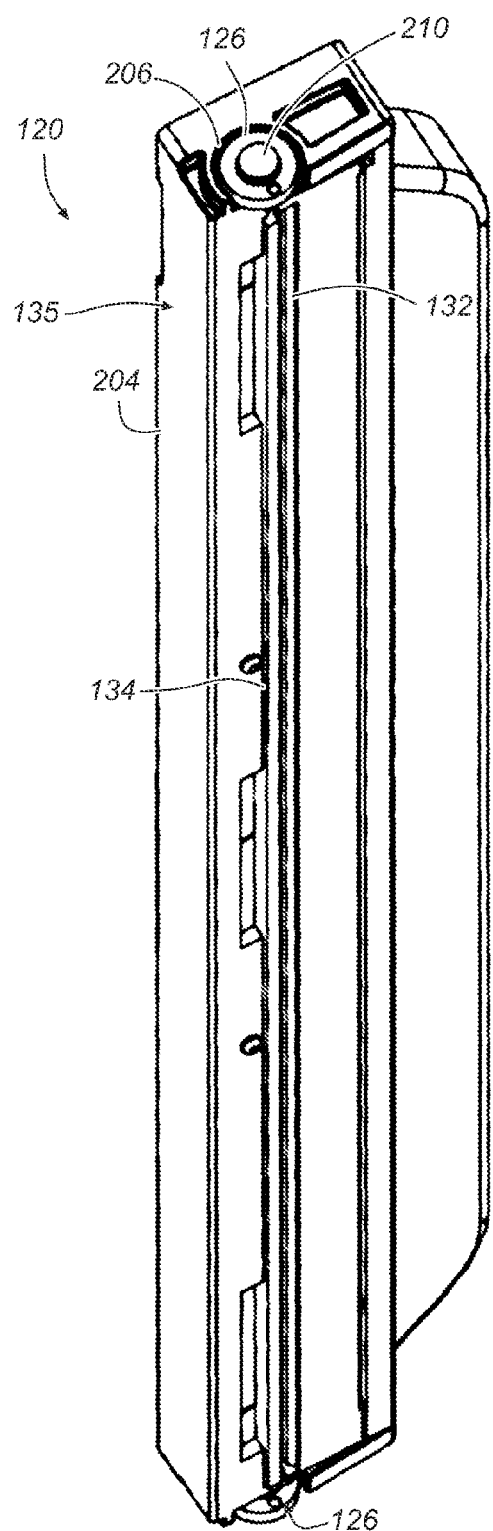
FIG. 2 shows a top perspective of a scanner module of the prior art scanner of FIG. 1.

As indicated above, one common type of spacer member 354 includes a wheel, such as wheel 126 in prior art FIG. 1. Another type of spacer member 354 that can be lower cost than wheel 126 is slider pad 353, as shown in the perspective of FIG. 7A, and the end view (along A-A) of FIG. 7B. As disclosed in U.S. Pat. No. 7,130,089, a rounded contact surface of slider pad 353 for contact with transparent platen 340 is advantageous relative to a flat pad for reducing the influence of irregularities or foreign matter. Such a lower area of contact is associated with lower friction. An advantage of a line of contact against transparent platen 340 as opposed to a point contact that a spherical contact surface would have is that the pressure acting on the contact region is less, leading to less wear of the contact surface, and thereby less variation of the distance between photosensor array 352 and the support surface 344 of transparent platen 340. In some embodiments, slider pad 353 can be injection molded as part of a housing 351 of scan bar assembly 350. In other embodiments, as shown in FIG. 7B, slider pad 353 can be molded with a mounting shaft 355 that can be press fit into housing 351. In this way, a different material can be used to make slider pad 353 than housing 351. For example, a material can be selected for slider pad 353 on the basis of properties such as low friction and low wear.

The invention has been described in detail with particular reference to certain preferred embodiments thereof, but it will be understood that variations and modifications can be effected within the spirit and scope of the invention.

PARTS LIST

120 Scanner
122 Platen
124 Carriage
126 Wheel
128 Bias
130 Drive
132 Light source
134 Reflected light capture unit
135 Scanner module
144 Top surface
152 Surface
158 Scan direction
200 Central portion
202 Side portion
204 Body
206 Well
210 Cap
214 Wheel
216 Stationary surface
220 Motor
224 Worm gear
225 Gear
226 Pinion gear
228 Pinion gear
230 Rack
300 Multifunction printer
311 Under side of automatic document feeder
312 Hinge
314 Pressing plate
330 Scanning apparatus
332 Scanning apparatus body
334 Scanning guide
335 Scanning direction
336 Frame
337 Down ramp
338 Up ramp
340 Transparent platen
342 ADF transparent platen
344 Support surface (of transparent platen)
346 Second surface (of transparent platen)
350 Scan bar assembly
351 Housing
352 Photosensor array
353 Slider pad
354 Spacer member (of scan bar assembly)
355 Mounting shaft
356 Illuminating unit
357 Light source
358 Light pipe
360 Inner side (of spacer member)
361 Outer side (of spacer member)
380 Automatic document feeder
382 Input tray
384 Output tray
386 Document feed rollers
388 Pressing member
390 Printing apparatus

The invention claimed is:

1. A scan bar assembly comprising:
an illuminating unit having a first length;
a photosensor array having a second length; and
a first spacer member and a second spacer member, each of the first and second spacer members including:
an inner side that is proximate the photosensor array; and
an outer side that is distal to the photosensor array, wherein a distance between the inner side of the first spacer member and the inner side of the second spacer member is greater than the second length of the photosensor array and less than the first length of the illuminating unit.

2. The scan bar assembly of claim 1, wherein the first and second spacer members include slider pads.

3. The scan bar assembly of claim 1, wherein the first and second spacer members include wheels.

4. The scan bar assembly of claim 1, wherein the photosensor array is disposed between the first spacer member and the second spacer member.

5. The scan bar assembly of claim 4, wherein the illuminating unit is substantially parallel to the photosensor array.

6. The scan bar assembly of claim 1, the illuminating unit further including a light source and a light pipe.

7. The scan bar assembly of claim 1, wherein a distance between the outer side of the first spacer member and the outer side of the second spacer member is less than the first length.

8. A scanning apparatus comprising: a transparent platen including: a first surface for supporting items to be scanned; and a second surface opposite the first surface; and a scan bar assembly including: an illuminating unit for providing illumination for scanning, the illuminating unit including a first length; a photosensor array for receiving reflected light from scanning, the photosensor array including a second length; and a first spacer member and a second spacer member, each of the first and second spacer members including: an inner side that is proximate the photosensor array; and an outer side that is distal to the photosensor array, wherein a distance between the inner side of the first spacer member and the inner side of the second spacer member is greater than the second length of the photo-sensor array and less than the first length of the illuminating unit.

9. The scanning apparatus of claim 8 wherein the first and second spacer members are biased to contact the second surface of the transparent platen.

10. The scanning apparatus of claim 9 further comprising a motor for moving the scan bar assembly, wherein the first and second spacer members remain in contact with the second surface of the transparent platen as the scan bar assembly is moved.

11. The scan bar assembly of claim 10, wherein the first and second spacer members include slider pads.

12. The scan bar assembly of claim 10, wherein the first and second spacer members include wheels.

13. The scan bar assembly of claim 8, wherein the photo-sensor array is disposed between the first spacer member and the second spacer member.

14. The scan bar assembly of claim 13, wherein the illuminating unit is substantially parallel to the photosensor array.

15. The scan bar assembly of claim 8, the illuminating unit further including a light source and a light pipe.

16. The scanning apparatus of claim 8, wherein the scanning apparatus is included in a multifunction printer that also includes a printing apparatus.

17. The scanning apparatus of claim 8, wherein a distance between the outer side of the first spacer member and the outer side of the second spacer member is less than the first length.

\* \* \* \* \*